(12) United States Patent
Ruhstaller et al.

(10) Patent No.: US 11,919,109 B2
(45) Date of Patent: Mar. 5, 2024

(54) WELDING DEVICES

(71) Applicant: PANATOOL TECHNOLOGIES INC., Comox (CA)

(72) Inventors: Michael Robert Ruhstaller, Comox (CA); Marcel Rene Ruhstaller, Vancouver (CA)

(73) Assignee: PANATOOL TECHNOLOGIES INC., Comox (CA)

( * ) Notice: Subject to any disclaimer, the term of this patent is extended or adjusted under 35 U.S.C. 154(b) by 397 days.

(21) Appl. No.: 17/240,476

(22) Filed: Apr. 26, 2021

(65) Prior Publication Data

US 2022/0040778 A1 Feb. 10, 2022

Related U.S. Application Data

(60) Provisional application No. 63/061,511, filed on Aug. 5, 2020.

(51) Int. Cl.
*B23K 9/095* (2006.01)
*B23K 37/02* (2006.01)

(52) U.S. Cl.
CPC ........ *B23K 9/0953* (2013.01); *B23K 37/0229* (2013.01)

(58) Field of Classification Search
CPC .............. B23K 37/0229; B23K 37/027; B23K 37/0276; B23K 37/0282; B23K 9/046; B23K 9/0953
USPC ..................................................... 219/130.01
See application file for complete search history.

(56) References Cited

U.S. PATENT DOCUMENTS

| 5,539,177 A | 7/1996 | Okuya et al. |
| 5,833,126 A | 11/1998 | Wark et al. |
| 6,284,995 B1 | 9/2001 | Esslinger et al. |
| 6,486,438 B1 | 11/2002 | Esslinger |
| 6,621,035 B2 | 9/2003 | Esslinger |
| 7,997,955 B2 | 8/2011 | Harmat |
| 8,118,210 B2 | 2/2012 | Greenwall |

(Continued)

FOREIGN PATENT DOCUMENTS

| CN | 106944831 A | 4/2019 |
| KR | 100919641 B1 | 9/2009 |
| WO | 2009036545 A1 | 3/2009 |

OTHER PUBLICATIONS https://www.sprtool.com/product/bore-welders/, Feb. 21, 2020.
(Continued)

*Primary Examiner* — Dana Ross
*Assistant Examiner* — James F Sims, III
(74) *Attorney, Agent, or Firm* — D'Ambrosio & Menon, PLLC; Usha Menon

(57) ABSTRACT

There is described a modular welding device having a welding torch assembly defining a welding axis and having a welding torch rotatable about the welding axis. The welding device further includes a drive assembly releasably attachable to the welding torch assembly and operable to linearly translate the welding torch assembly along an axis of translation. When the drive assembly is attached to the welding torch assembly in a first orientation relative to the welding torch assembly, the drive assembly is detachable from the welding torch assembly and re-attachable to the welding torch assembly so as to be disposed in a second orientation relative to the welding torch assembly.

20 Claims, 12 Drawing Sheets

(56) References Cited

U.S. PATENT DOCUMENTS

| | | |
|---|---|---|
| 8,319,139 B2 | 11/2012 | Esslinger |
| 2011/0079585 A1* | 4/2011 | Cambrey ........... B23K 37/0276 |
| | | 219/76.1 |
| 2020/0164454 A1* | 5/2020 | Huetter ................. B23K 9/173 |

OTHER PUBLICATIONS https://www.climaxportable.com/products/welding-machines/, Feb. 21, 2020.
https://www.repairbores.com/products, Feb. 21, 2020.
https://en.wikipedia.org/wiki/Linear_actuator, Jun. 23, 2020.

* cited by examiner

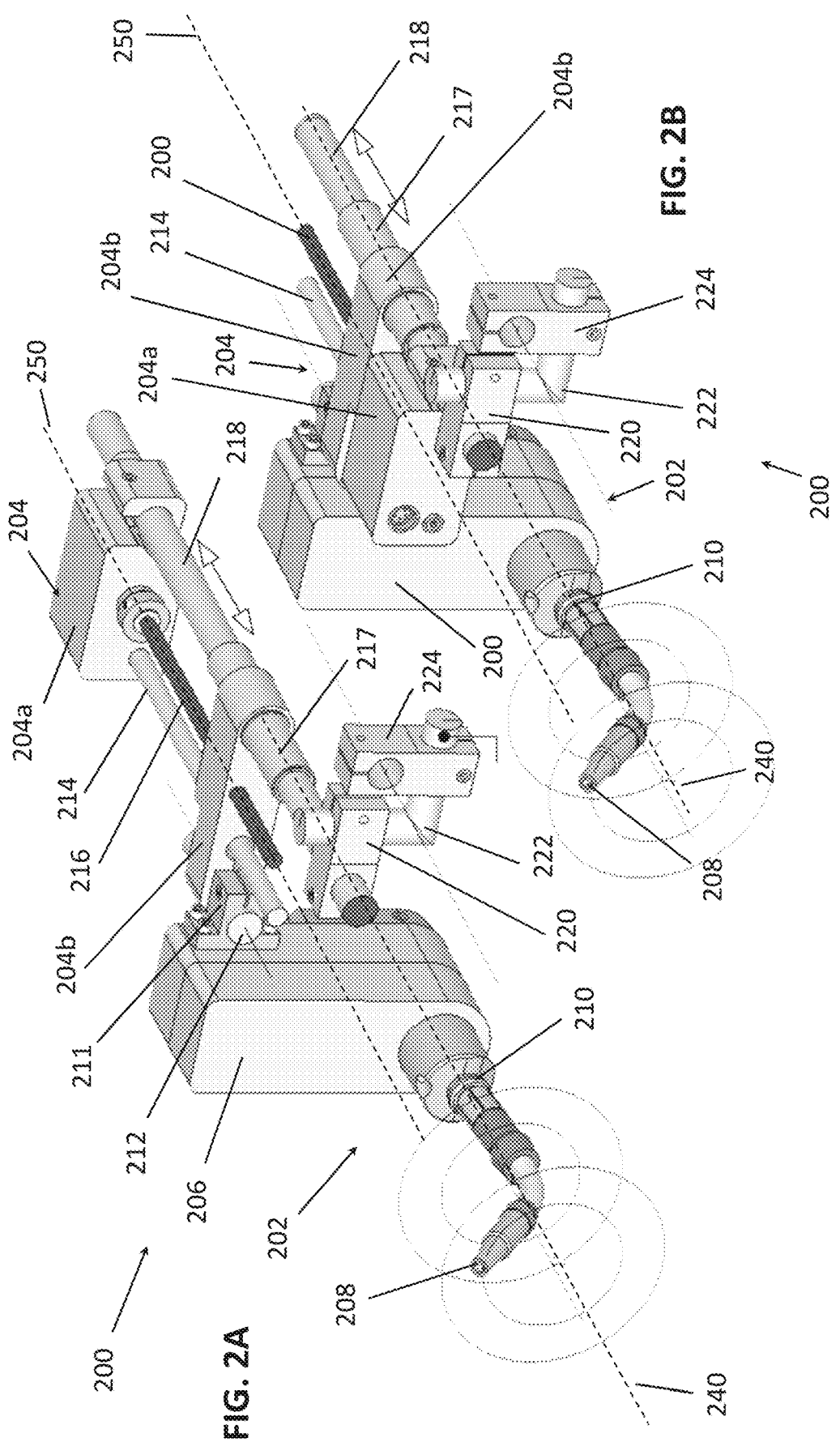

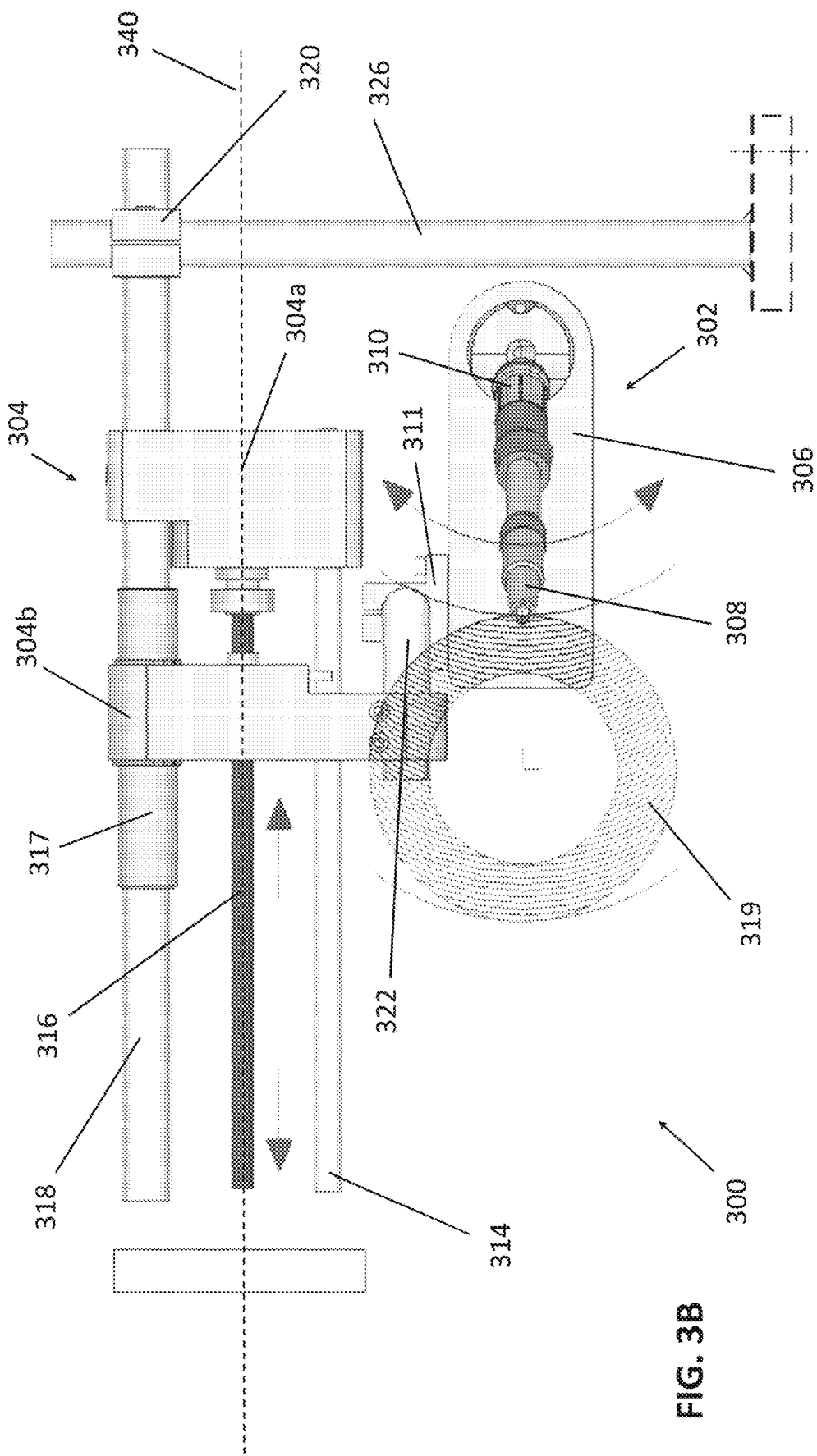

WELDING DEVICES

CROSS REFERENCE TO RELATED APPLICATION(S)

This application is related to and claims priority to U.S. Provisional Patent Application No. 63/061,511 filed on Aug. 5, 2020, the contents of which are incorporated by reference herein.

FIELD OF THE DISCLOSURE

The present disclosure relates to welding devices that may be used, for example, for bore welding and pad welding.

BACKGROUND TO THE DISCLOSURE

Bore welders are used to build up material in worn-out bores of heavy machinery, or to build up cylindrical surfaces in manufacturing. The welding source of a bore welder is typically the same as that used for Metal Inert Gas (MIG) hand welding, except that the hand torch is replaced by a mechanism that continuously rotates the torch tip while stepping axially after each complete turn. Sometimes the axial motion is continuous rather than discrete, resulting in a spiral weld bead.

The time saved when using a bore welder to build up a cylindrical surface can be significant when compared to welding by hand. Bore welding also allows the welder to step away from the hazardous fumes that are produced during the welding process, while also generally leading to a more uniform weld.

Existing bore welders typically combine the linear and rotary drivers such that they cannot be separated. When combined in this fashion, the rotary shaft must be longer by at least the distance that the shaft is linearly displaced. This can limit the ability to use the machine in confined spaces. Furthermore, known bore welders generally require a separate accessory or attachment in order to be able to build up material on a pipe flange. Such a separate accessory or attachment adds special constraints to the welding setup, as well as potentially adding cost and complexity to the welding device.

SUMMARY OF THE DISCLOSURE

According to a first aspect of the disclosure, there is provided a welding device comprising a welding torch assembly defining a welding axis and comprising a welding torch rotatable about the welding axis. The welding device further comprises a drive assembly releasably attachable to the welding torch assembly and operable to linearly translate the welding torch assembly along an axis of translation. When the drive assembly is attached to the welding torch assembly in a first orientation relative to the welding torch assembly, the drive assembly is detachable from the welding torch assembly and re-attachable to the welding torch assembly so as to be disposed in a second orientation relative to the welding torch assembly.

When the drive assembly is attached to the welding torch assembly in the first orientation, the drive assembly may be attached to the welding torch assembly at an attachment location on the welding torch assembly. When the drive assembly is attached to the welding torch assembly in the second orientation, the drive assembly may be attached to the welding torch assembly at the same attachment location.

When the drive assembly is attached to the welding torch assembly in the first orientation, the drive assembly may be attached to the welding torch assembly at an attachment location on the welding torch assembly. When the drive assembly is attached to the welding torch assembly in the second orientation, the drive assembly may be attached to the welding torch assembly at a different attachment location.

The welding torch assembly may further comprise a head module. The head module may be operable to drive rotation of the welding torch about the welding axis and relative to the head module, and the drive assembly may be releasably attachable to the head module.

The drive assembly may comprise a first carriage module and a second carriage module, the second carriage module may be operable to linearly translate the first carriage module along the axis of translation, and the first carriage module may be releasably attachable to the head module.

The drive assembly may be operable to linearly translate the welding torch assembly along the axis of translation using one or more of: a linear actuator; a lead screw; a rack and pinion; a belt drive; and a cable drive.

The drive assembly may further comprise one or more guide members extending from the first carriage module to the second carriage module and for guiding linear translation of the welding torch assembly along the axis of translation.

The welding device may further comprise an attachment device for securing the welding device relative to a workpiece when the welding device is in use.

The attachment device may be releasably attachable to at least one of the one or more guide members.

The attachment device may comprise a first member that, when the attachment device is attached to the at least one guide member, extends perpendicularly to the axis of translation. The attachment device may comprise a second member that extends perpendicularly to the first member and that, when the attachment device is attached to the at least one guide member, extends perpendicularly to the axis of translation.

The attachment device may further comprise a first clamping device releasably attachable to the first member, and a second clamping device releasably attachable to the second member. The first member may be releasably attachable to the at least one guide member using the first clamping device, and, when attached to the first clamping device, the first member may be rotatable relative to the first clamping device for adjusting an orientation of the drive assembly about a first axis of orientation. The second member, when attached to the second clamping device, may be rotatable relative to the second clamping device for adjusting an orientation of the drive assembly about a second axis of orientation, when the attachment device is attached to the at least one guide member.

When the drive assembly is attached to the welding torch assembly in the first orientation, the welding torch may extend from the head module in a first direction, and the second carriage module may be operable to linearly translate the first carriage module along the axis of translation and in the first direction. When the drive assembly is attached to the welding torch assembly in the second orientation, the welding torch may extend from the head module in the first direction, and the second carriage module may be operable to linearly translate the first carriage module along the axis of translation and in a second direction opposite the first direction.

When the drive assembly is attached to the welding torch assembly in the first orientation or the second orientation relative to the welding torch assembly, the drive assembly may be detachable from the welding torch assembly and re-attachable to the welding torch assembly so as to be disposed in at least a third orientation relative to the welding torch assembly. In the third orientation, the axis of translation may be perpendicular to the welding axis.

When the drive assembly is attached to the welding torch assembly in the third orientation, the drive assembly may be attached to the welding torch assembly using a right-angle pin.

The welding device may further comprise a controller comprising one or more processors for performing one or more of: controlling the drive assembly so as to control linear translation of the welding torch assembly along the axis of translation; controlling the welding torch assembly so as to control rotation of the welding torch about the welding axis; and activating and deactivating a welding source for the welding torch.

The welding device may further comprise an extension member releasably attachable to the welding torch assembly and to the drive assembly.

When attached to the drive assembly, the extension member may be rotatable relative to the drive assembly about a first axis of rotation. When attached to welding torch assembly, the extension member may be rotatable relative to the welding torch assembly about a second axis of rotation.

The first axis of rotation may be parallel to the second axis of rotation.

The drive assembly may be a first drive assembly, the axis of translation may be a first axis of translation, and the welding device may further comprise a second drive assembly releasably attachable to the first drive assembly and operable to linearly translate the first drive assembly along a second axis of translation.

The first axis of translation may be perpendicular to the second axis of translation.

According to a further aspect of the disclosure, there is provided a welding device comprising a welding torch assembly defining a welding axis and comprising a welding torch rotatable about the welding axis. The welding device further comprises a drive assembly releasably attached to the welding torch assembly in a first orientation relative to the welding torch assembly. The drive assembly is operable to linearly translate the welding torch assembly along an axis of translation. The drive assembly is detachable from the welding torch assembly and re-attachable to the welding torch assembly so as to be disposed in a second orientation relative to the welding torch assembly.

According to a further aspect of the disclosure, there is provided a welding device comprising a welding assembly defining a welding axis and comprising a welding torch rotatable about the welding axis. The welding device further comprises a linear assembly movably coupled to the welding assembly. The welding device further comprises a drive mechanism operable to drive linear translation of the welding assembly relative to the linear assembly. The welding assembly is movable relative to the linear assembly between a first orientation, in which the drive mechanism is operable to drive linear translation of the welding assembly relative to the linear assembly along a first axis of translation, and a second orientation, in which the drive mechanism is operable to drive linear translation of the welding assembly relative to the linear assembly along a second axis of translation.

The first axis of translation may be perpendicular to the welding axis, and the second axis of translation may be parallel to the welding axis.

The first axis of translation may be perpendicular to the second axis of translation.

The welding assembly may be rotatable relative to the linear assembly and between the first and second orientations.

The linear assembly may comprise a rack, and the drive mechanism may comprise a gear engaged with the rack for linearly translating the welding assembly relative to the linear assembly.

The linear assembly may further comprise a guide member extending parallel to the rack for guiding linear translation of the welding assembly relative to the linear assembly.

The welding device may further comprise an attachment device releasably attached to the linear assembly, for securing the welding device relative to a workpiece when the welding device is in use.

The attachment device may comprise: a first member that extends perpendicularly to the first and second axes of translation; and a second member that extends perpendicularly to the first member and that extends perpendicularly to the first and second axes of translation.

The attachment device may further comprise a first clamping device releasably attached to the first member, and a second clamping device releasably attached to the second member. The first member may be releasably attached to the linear assembly using the first clamping device, and the first member may be rotatable relative to the first clamping device for adjusting an orientation of the linear assembly about a first axis of orientation. The second member may be rotatable relative to the second clamping device for adjusting an orientation of the linear assembly about a second axis of orientation.

The attachment device may be releasably attached to a spacer block extending between the rack and the guide member.

The gear may extend from a first side of the welding assembly, and the guide member may be attached to the welding assembly on a second side of the welding assembly. The first side may be opposite the second side.

The welding assembly may comprise one or more first motors for driving rotation of the welding torch, the drive mechanism may comprise one or more second motors for driving linear translation of the welding assembly relative to the linear assembly, and the one or more first motors and the one or more second motors may be provided in a common housing.

The welding device may further comprise a controller comprising one or more processors for performing one or more of: controlling the drive mechanism so as to control linear translation of the welding assembly relative to the linear assembly along the first or second axis of translation; controlling the welding assembly so as to control rotation of the welding torch about the welding axis; and activating and deactivating a welding source for the welding torch.

According to a further aspect of the disclosure, there is provided a welding device comprising a welding torch defining a welding axis. The welding device further comprises a first linear drive assembly operable to linearly translate the welding torch along a first axis of translation. The welding device further comprises a second linear drive assembly operable to linearly translate the first linear drive assembly along a second axis of translation.

The first axis of translation may be perpendicular to the welding axis. The second axis of translation may be perpendicular to the first axis of translation and perpendicular to the welding axis.

According to a further aspect of the disclosure, there is provided a welding device comprising a head module operable to drive rotation of a workpiece platform. The welding device further comprises a drive assembly releasably attached to the head module. The welding device further comprises a welding torch releasably attached to the drive assembly. The drive assembly is operable to drive linearly translation the welding torch along an axis of translation and relative to the workpiece platform.

The axis of translation may be perpendicular to the axis of rotation.

The welding device may further comprise a workpiece secured to the workpiece platform.

BRIEF DESCRIPTION OF THE DRAWINGS

Embodiments of the disclosure will now be described in detail in conjunction with the accompanying drawings of which:

FIGS. 2A and 2B show a modular welding device in respective first and second configurations, according to embodiments of the disclosure;

FIG. 3B shows a side-one view of the modular welding device of FIG. 3A, according to an embodiment of the disclosure;

DETAILED DESCRIPTION

Figure 1:
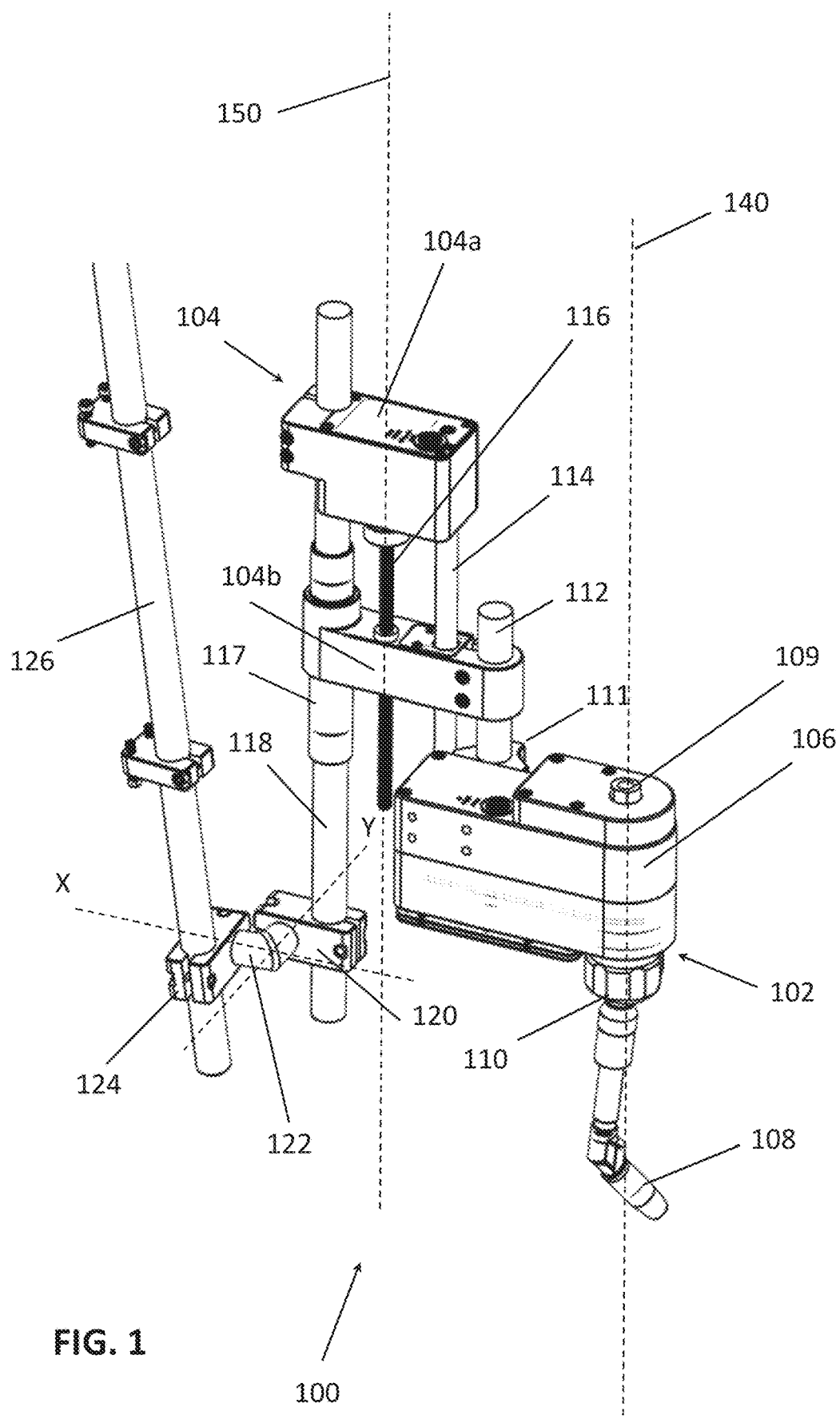
FIG. 1 shows a modular welding device according to an embodiment of the disclosure.

The present disclosure seeks to provide new and improved welding devices. While various embodiments of the disclosure are described below, the disclosure is not limited to these embodiments, and variations of these embodiments may fall within the scope of the disclosure which is to be limited only by the appended claims.

Throughout the disclosure, the word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Generally, according to embodiments of the disclosure, there is described a modular welding device. The welding device comprises a welding torch assembly defining a welding axis and comprising a welding torch rotatable about the welding axis. A drive assembly is releasably attached to the welding torch assembly in a first orientation, and is operable to linearly translate the welding torch assembly along an axis of translation. The drive assembly is detachable from the welding torch assembly and may be re-attached to the welding torch assembly so as to be disposed in a second orientation relative to the welding torch assembly. Therefore, the drive assembly may be moved between at least first and second orientations relative to the welding torch assembly. The different orientations of the drive assembly relative to the welding torch assembly may be useful, for example, in enabling the welding device to be used in spaces requiring greater clearance, or to transition the welding device between a configuration in which the welding device is enabled for bore welding and a configuration in which the welding device is enabled for pad welding.

According to further embodiments of the disclosure, there is also described a welding device that may be transitioned between a first configuration for performing bore welding and a second configuration for performing pad welding. The welding device comprises a welding assembly defining a welding axis and comprising a welding torch rotatable about the welding axis. The welding device further includes a linear assembly movably coupled to the welding assembly, and a drive mechanism operable to drive linear translation of the welding assembly relative to the linear assembly. The welding assembly is furthermore movable, for example rotatable, relative to the linear assembly and between first and second orientations. In the first orientation, the drive mechanism is operable to drive linear translation of the welding assembly relative to the linear assembly along a first axis of translation. In the second orientation, the drive mechanism is operable to drive linear translation of the welding assembly relative to the linear assembly along a second axis of translation which, for example, may be perpendicular to the first axis of translation. Therefore, the welding assembly may be moved between at least first and second orientations relative to the linear assembly. The different orientations of the welding assembly relative to the linear assembly may be useful, for example, in enabling the welding device to transition between a configuration in which the welding device is enabled for bore welding and a configuration in which the welding device is enabled for pad welding.

Currently, different welding machines may be required for welds of different dimensional ranges, with welding power limitations being tied to these dimensional ranges. Welding devices as described herein may alleviate these constraints, and may be used for a relatively larger range of workpiece sizes. Furthermore, with currently available bore welders, the axial clearance to the opening of the bore must generally be much greater due to the design limitations of overlaying the rotation and translation actuators, or due to the inability to separate the rotation and translation actuators.

Turning to FIG. 1, there is shown an embodiment of a modular welding device 100 according to the present disclosure. Welding device 100 comprises a welding torch assembly 102 movably connected to a drive assembly 104. Welding torch assembly 102 comprises head module 106 to which is rotatably coupled a welding torch 108. Welding torch 108 is connected to head module 106 by a neck adapter 110 enabling rapid release of welding torch 108 from head module 106 and enabling welding torch 108 to be pivoted relative to head module 106 within a range of orientations. For example, welding torch 108 may be angled by up to 45° relative to a welding axis 140 defined by head module 106. Welding torch 108 is rotatable about welding axis 140 through the operation of one or more motors or other drive mechanisms provided within head module 106 but not shown in FIG. 1.

Although not shown in FIG. 1, a back-end conduit (not shown in FIG. 1 but shown in FIG. 4) may be connected to head module 106 at a connecting port 109, for supplying welding wire, current, and gas from a Metal Inert Gas (MIG) welding source (not shown). Head module 106 includes an internal slip ring allowing up to 250 Amperes of welding current to be transferred to welding torch 108.

Drive assembly 104 includes a first carriage module 104a and a second carriage module 104b movably connected to first carriage module 104a. In particular, first carriage module 104a is movably connected to second carriage module 104b by means of a slide shaft 118, a lead screw 116, and a guide shaft 114. Head module 106 is attached to second carriage module 104b using a connecting shaft 112. Second carriage module 104b is configured to be slid off of connecting shaft 112 in order to decouple drive assembly 104 from welding torch assembly 102. Connecting shaft 112 is attached to head module 106 using a clamp 111 secured to head module 106 and connecting shaft 112. To increase the dynamic range of welding device 100, the lengths of guide shaft 114 and lead screw 116 may be increased, for example.

Through the operation of one or more motors or other drive mechanisms provided within first carriage module 104a, first carriage module 104a is configured to drive linear translation of second carriage module 104b along an axis of translation 150. In particular, second carriage module 104b comprises a bearing sleeve 117 configured to movably slide over slide shaft 118 as second carriage module 104b moves along axis of translation 150. In the embodiment of FIG. 1, the linear translation of second carriage module 104b relative to first carriage module 104a is driven by lead screw 116, with guide shaft 114 and slide shaft 118 assisting the linear movement of second carriage module 104b relative to first carriage module 104a. Guide shaft 114 furthermore prevents the second carriage module 104b from rotating around slide shaft 118 during operation of drive assembly 104.

Slide shaft 118 is connected to a mounting shaft 126 using an adapter or other attachment device such as a right-angle pin 122 (which may also be referred to as elbow pin 122). Elbow pin 122 comprises a first member and a second member disposed at a right angle to the first member. Elbow pin 122 is secured to brackets or clamps 120 and 124 respectively on slide shaft 118 and mounting shaft 126. Mounting shaft 126 may be secured to the workpiece or to a solid structure if the workpiece is also stably connected to the ground. Alternatively, mounting shaft 126 can be attached to a stand (shown in dashed lines in FIG. 3B). Both mounting shaft 126 and the stand can be clamped or tack welded to the workpiece or solid structure. Elbow pin 122 is rotatable within both clamp 120 and clamp 124. Therefore, the orientation of drive assembly 104 and welding torch assembly 102 may be adjusted with respect to two separate and orthogonal axes of orientation X and Y as defined by the first member and second member of elbow pin 122. This may enable drive assembly 104 and welding torch assembly 102 to be systematically and efficiently oriented relative to the workpiece prior to welding.

Although not shown in FIG. 1, welding device 100 includes a controller. For example, according to some embodiments, the controller may be comprised in the control system described in further detail below and in connection with FIG. 8. The controller may comprise, for example, one or more processors operable to read computer program code stored in a suitable computer-readable medium. By executing the computer program code, the one or more processors enable the controller to control movement of welding torch 108 relative to the workpiece in need of welding. For example, during the operation of welding tool 100, the controller may control movement of welding torch 108 both about welding axis 140 and axis of translation 150. Furthermore, the controller provides coordination of both rotation of welding torch 108 about welding axis 140 and linear translation of welding torch 108 along axis of translation 150, while turning the welding source on and off at predetermined points in time, depending on the desired weld.

In particular, the controller controls head module 106 such that welding torch 108 rotates about welding axis 140 at, for example, a predetermined rate of rotation, or at a predetermined offset angle relative to welding axis 140, depending on the type of weld that the user wishes to obtain. In addition to controlling the rotation of welding torch 108 about welding axis 140, the controller controls linear translation of welding torch 108 along axis of translation 150, by controlling drive assembly 104. In particular, the controller may actuate drive assembly 104 such that first carriage module 104a drives second carriage module 104b in either direction along axis of translation 150, by means of lead screw 116. For example, the controller may cause lead screw 116 to rotate, such rotation causing second carriage module 104b to linearly translate relative to first carriage module 104a. As second carriage module 104b is translated relative to first carriage module 104a, so is head module 106 translated relative to first carriage module 104a, by virtue of head module 106 being connected to second carriage module 104b by connecting shaft 112. Thus, by controlling both the rotation of welding torch 108 about welding axis 140, and the translation of head module 106 along axis of translation 150, the controller is able to control the particular shape of the weld that is being made. Other parameters of the welding process may also be controlled using the controller, such as the speed of the welding process. For example, bore welding may be achieved as a spiral, or through consecutively stacked circular welds (e.g. by repeatedly translating head module 106 once per rotation at half the welding speed, for the same radial position). A particular feature of welding device 100 is that drive assembly 104 is detachably secured to welding torch assembly 102. In particular, second carriage module 104b may be detached from head module 106 by detaching connecting shaft 112 from clamp 111. Once detached from clamp 111, second carriage module 104b may be re-attached to head module 106 in a different orientation, using the same connecting shaft 112 or another connecting piece, such as elbow pin 122 (as will be described in further detail below). For example, after being detached from welding torch assembly 102, drive assembly 104 may be pivoted 180° and secured to the other side of clamp 111, as will now be shown in further detail.

Turning to FIGS. 2A and 2B, there are shown embodiments of a welding device 200 that is similar to welding device 100. Accordingly, like components of welding device 200 and welding device 100 are numbered using similar reference numbers, as are the reference numbers of all other welding devices described herein with reference to the drawings.

In FIG. 2A, there is shown an embodiment of modular welding device 200 in which drive assembly 204 is secured relative to welding torch assembly 202 in a first orientation. In particular, in this first orientation, welding torch 208 extends away from head module 206 in a first direction, and first carriage module 204a is operable to drive linear translation of second carriage module 204b along axis of translation 250 in this first direction.

However, welding device 200 may be reconfigured such that drive assembly 204 may be secured relative to welding torch assembly 202 in a second orientation that is different from the first orientation. In particular, drive assembly 204 is detached from welding torch assembly 202 by detaching second carriage module 204b from head module 206, by releasing connecting shaft 212 from clamp 211. Drive assembly 202 is then pivoted 180° and re-secured to welding torch assembly 202 by re-securing second carriage module 204b to head module 206 in an alternative orientation, as can be seen in FIG. 2B. In this second orientation, welding torch 208 extends away from head module 206 in a first direction, and first carriage module 204a is operable to drive linear translation of second carriage module 204b along axis of translation 250 in a second direction that is opposite to the first direction.

In both the first and second orientations or configurations, welding device 200 is setup for performing bore welding. However, in the configuration shown in FIG. 2B, greater clearance may be provided for the user, making the configuration shown in FIG. 2B more suitable for performing welding in enclosed spaces or where there may otherwise be insufficient clearance to enable drive assembly 204 to enable translation of welding torch assembly 202 along its full range of motion.

Figure 3A:
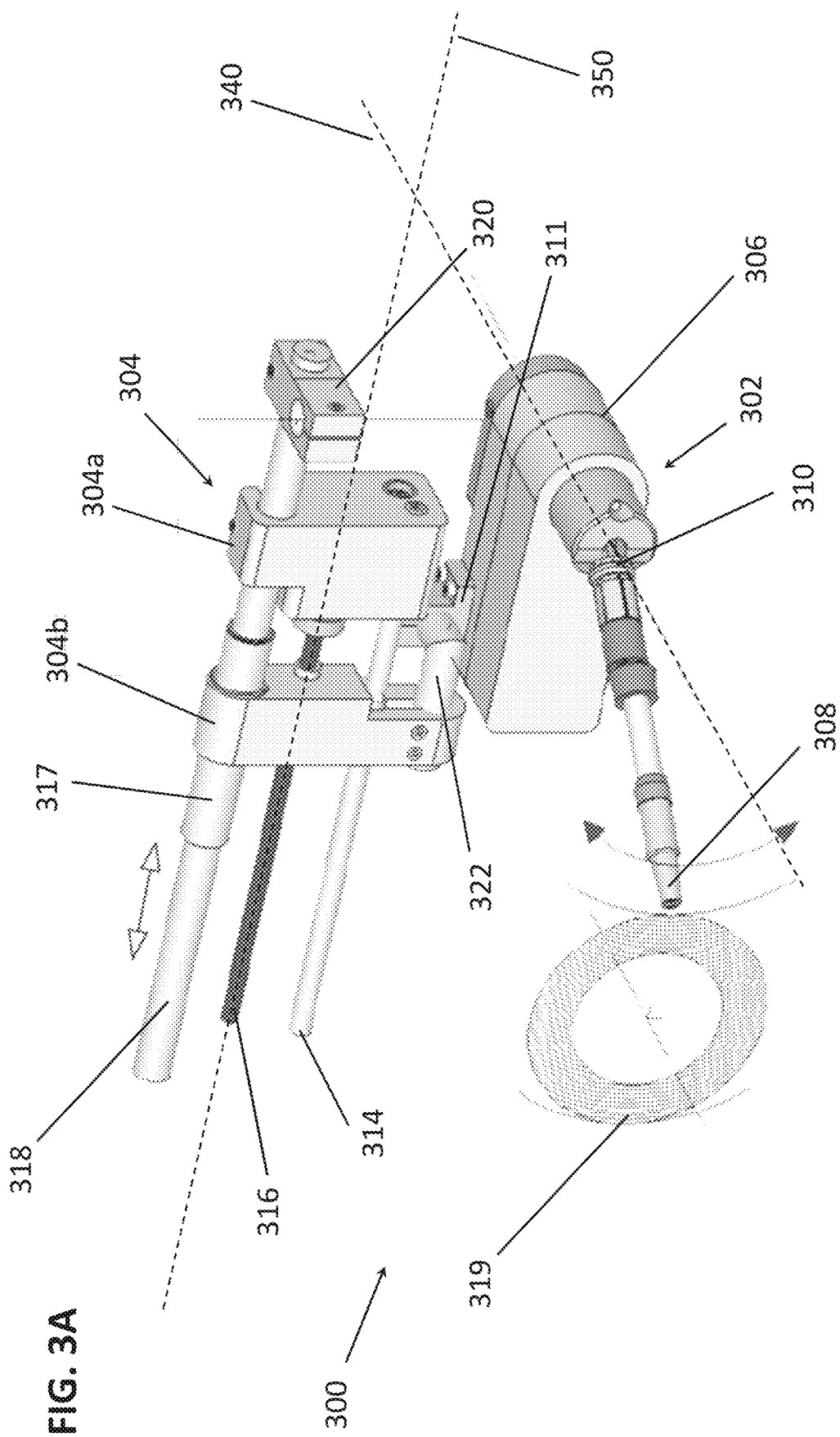
FIG. 3A shows the modular welding device of FIGS. 2A and 2B in a third configuration, according to an embodiment of the disclosure.

It should be noted that FIGS. 2A and 2B merely show one example in which the orientation of drive assembly 204 relative to welding torch assembly 202 may be reconfigured. For example, according to other embodiments, drive assembly 204 may be detached from its coupling (formed by clamp 211 and connecting shaft 212) to welding torch assembly 202 as shown in FIG. 2A or 2B, and re-attached at one or more other locations provided on welding torch assembly 202, and not necessarily the same location. Furthermore, a different connecting member may be used to re-connect drive assembly 204 and welding torch assembly 202. For example, instead of using connecting shaft 212, an elbow pin such as elbow pin 222 may be used—such a connecting member may enable the relative orientations of welding axis 240 and axis of translation 250 to be adjusted, and may be used to reconfigure welding device 200 from a setup designed for bore welding to a setup designed for pad welding. FIGS. 3A and 3B show an example of this.

In particular, FIGS. 3A and 3B show a modular welding device 300 disposed in a configuration in which drive assembly 304 is disposed in third orientation relative to welding torch assembly 302. In particular, drive assembly 304 is connected to welding torch assembly 302 by means of elbow pin 322 and clamp 311 secured to head module 306. The use of elbow pin 322 to secure drive assembly 304 to welding torch assembly 302 orients axis of translation 340 perpendicularly to welding axis 350. According to this configuration, welding device 300 is better orientated for pad welding, as can be seen in FIG. 3B in particular in which a face weld 319 is being made through consecutive arced movement of welding torch 308.

As in the embodiments described above, the connection of drive assembly 304 to welding torch assembly 302 is not permanent, and drive assembly 304 may be detached from welding torch assembly 302 and reattached to welding torch assembly 302 in a different orientation, such as the first or second orientation described above in connection with FIGS. 2A and 2B.

Figure 4:
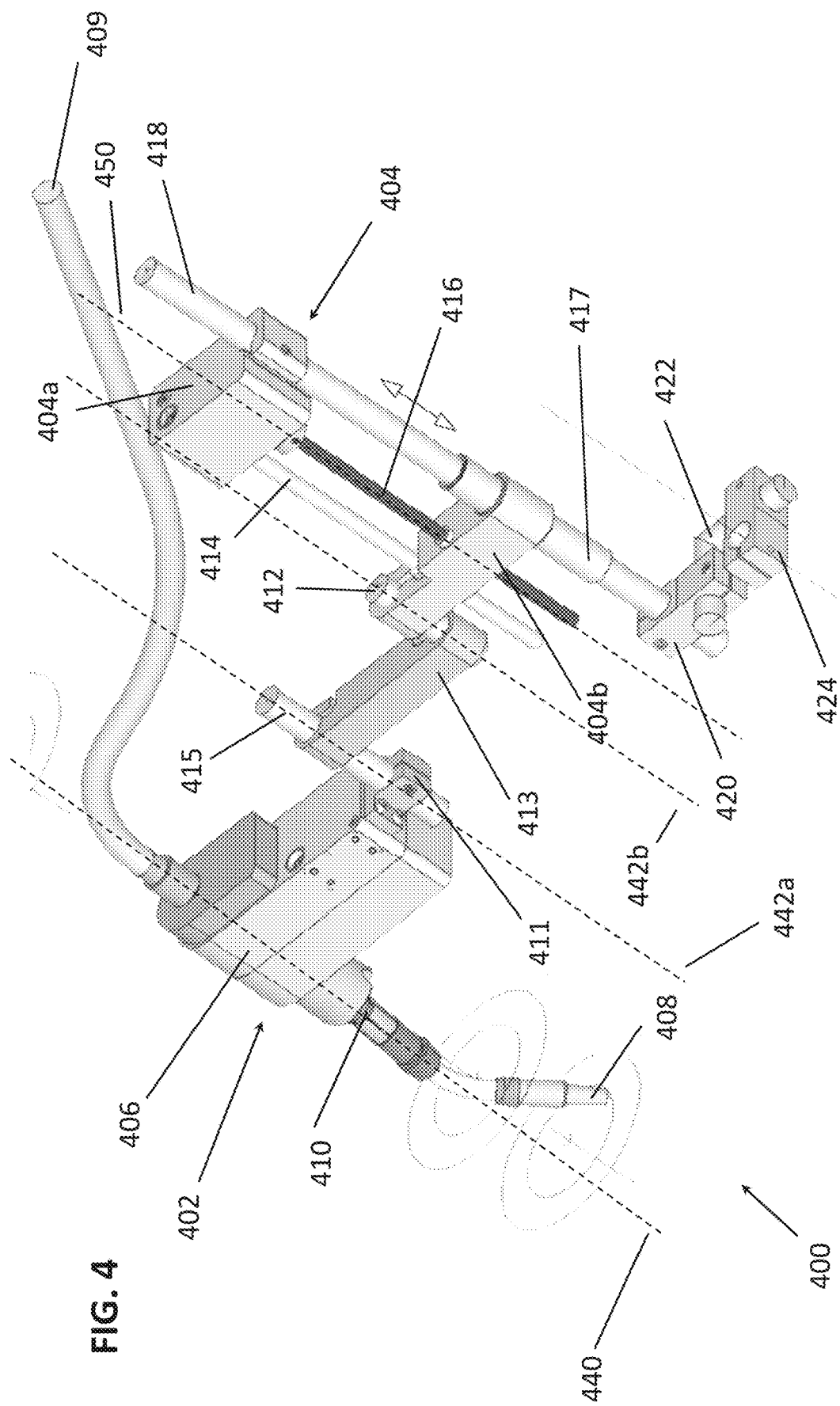
FIG. 4 shows a modular welding device according to an embodiment of the disclosure.

Turning to FIG. 4, there is shown another embodiment of a modular welding device 400 according to the present disclosure. In this embodiment, welding device 400 includes an extension member 413 releasably attached to both welding torch assembly 402 and to the drive assembly 404. In particular, extension member 413 is releasably secured to welding torch assembly 402 by means of a connecting shaft 415 connected to clamp 411 on head module 406, and extension member 413 is releasably secured to drive assembly 404 by means of connecting shaft 412 connected to second carriage module 404b. Extension member 413 is rotatable relative to welding torch assembly 402 about a first axis of rotation 442a, and extension member 413 is rotatable relative to drive assembly 404 about a second axis of rotation 442b. Axes of rotation 442a and 442b may enable improved orientation of welding torch assembly 402 and drive assembly 404 prior to the welding process. This may enable welding device 400 to reach into confined spaces that may be too small to fit drive assembly 404 into. Extension member 413 may furthermore prevent collision of rotating parts on large inside-diameter or outside-diameter setups, and may allow drive assembly 404 to remain outside of the working diameter.

Figure 5:
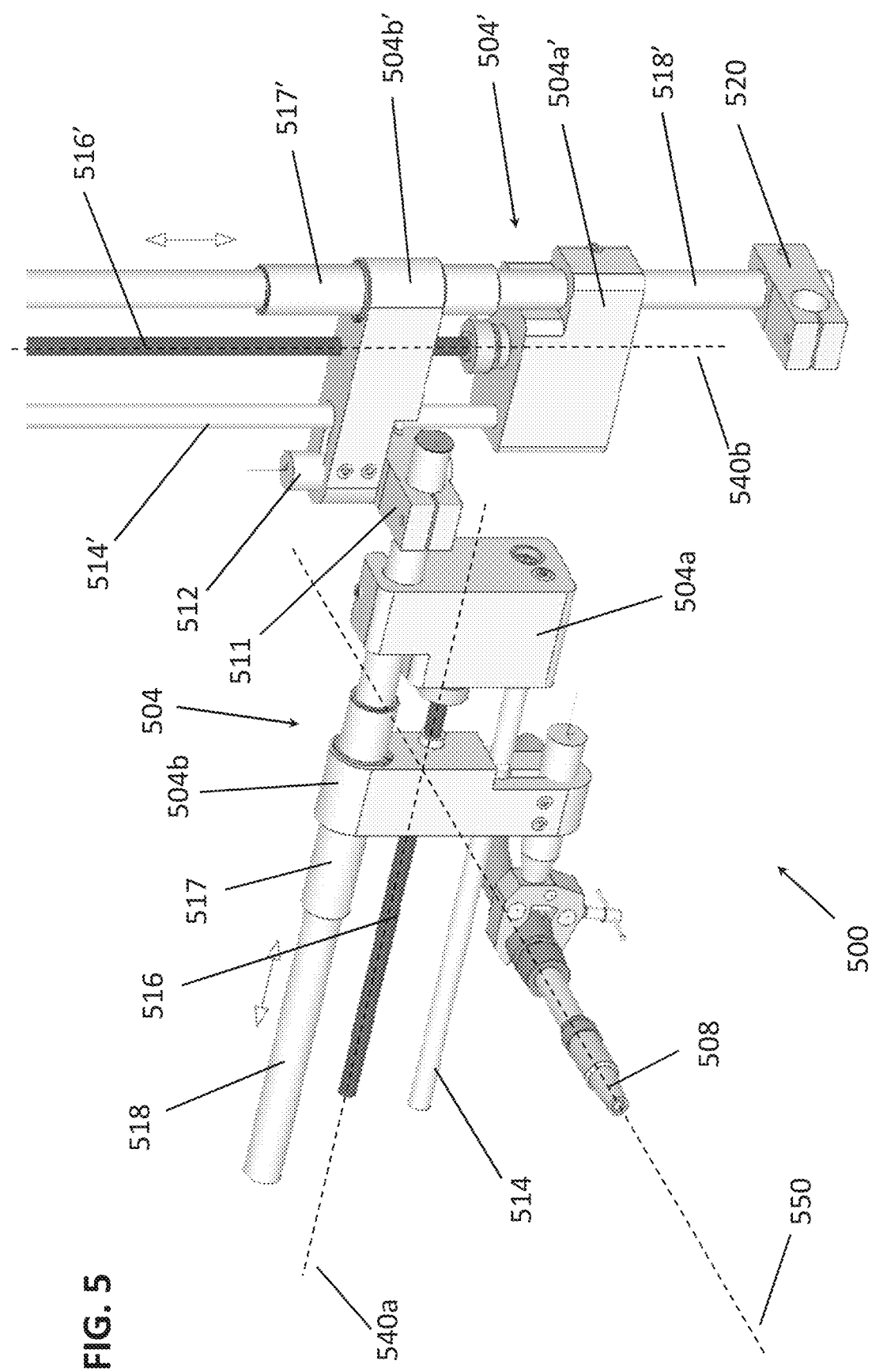
FIG. 5 shows a modular welding device according to an embodiment of the disclosure.

Turning now to FIG. 5, there is shown another embodiment of a modular welding device 500 according to the present disclosure. In this embodiment, in addition to drive assembly 504, welding device 500 includes a further drive assembly 504'. Thus, welding device 500 is configured to drive linear translation of welding torch 508 along two separate axes of translation, 540a and 540b. Drive assembly 504' is releasably connected to drive assembly 504 using clamp 511. In particular, slide shaft 518 extends through clamp 511, and connecting shaft 512 also extends through clamp 511 and through second carriage module 504b' of drive assembly 504'. Connecting shaft 512 is disposed perpendicularly to slide shaft 518, such that axis of translation 540a is perpendicular to axis of translation 540b.

Welding device 500 may be used primarily to provide non-circular welds, since welding torch 508 is fixed relative to drive assembly 504 rather than being rotatable about a welding axis. Nevertheless, according to some embodiments, welding device 500 may also provide circular welds through appropriate control of both drive assembly 504 and drive assembly 504'. Welding device 500 may furthermore be used to clad a rectangular or other surface. Through appropriate programming of the controller, welding device 500 could, for example, be used to weld lettering onto workpieces or add a pattern of weld beads to a surface to protect against wear.

Figure 6A:
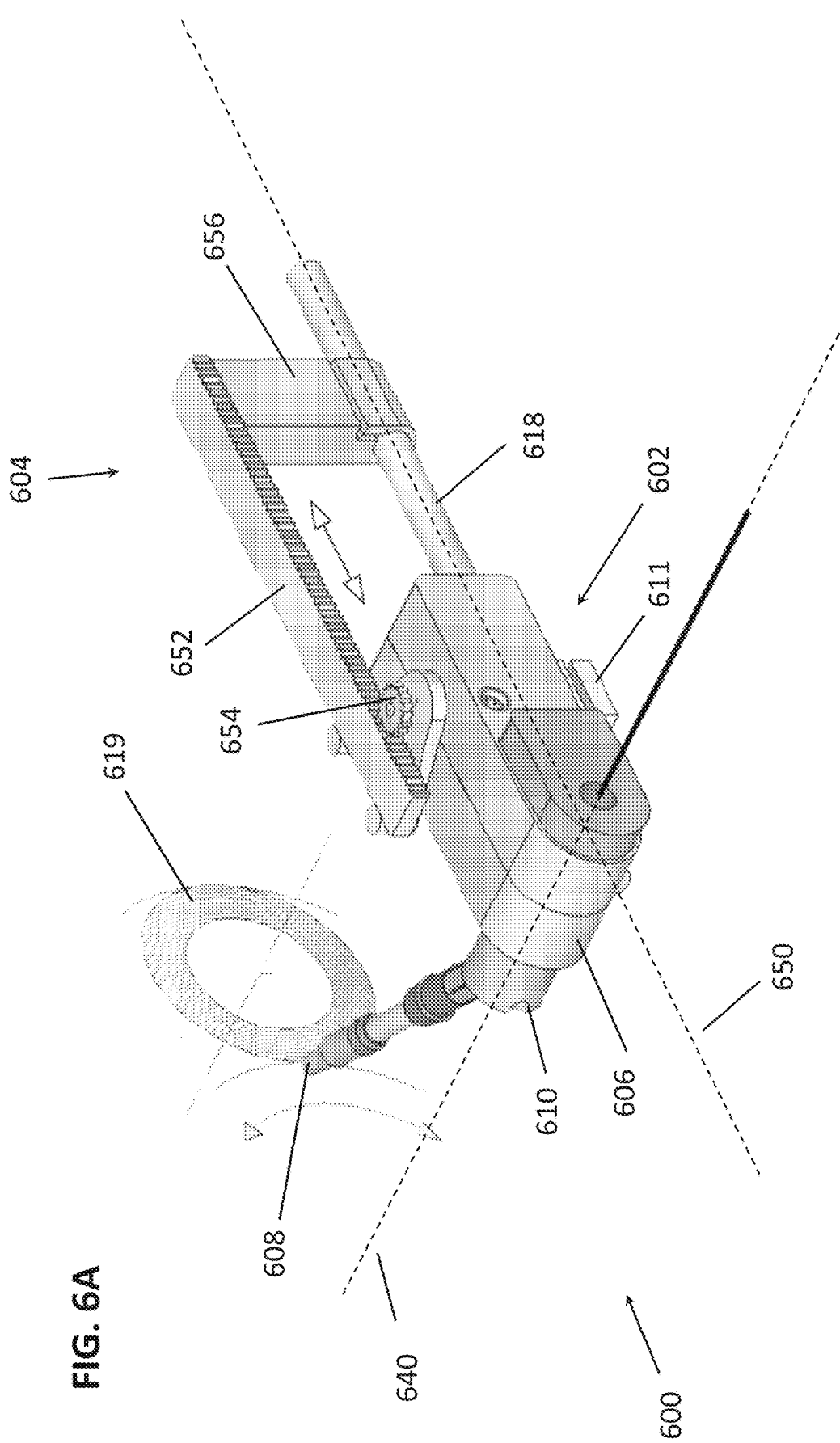
FIGS. 6A and 6B show a welding device in respective first and second configurations, according to embodiments of the disclosure.
Figure 6B:
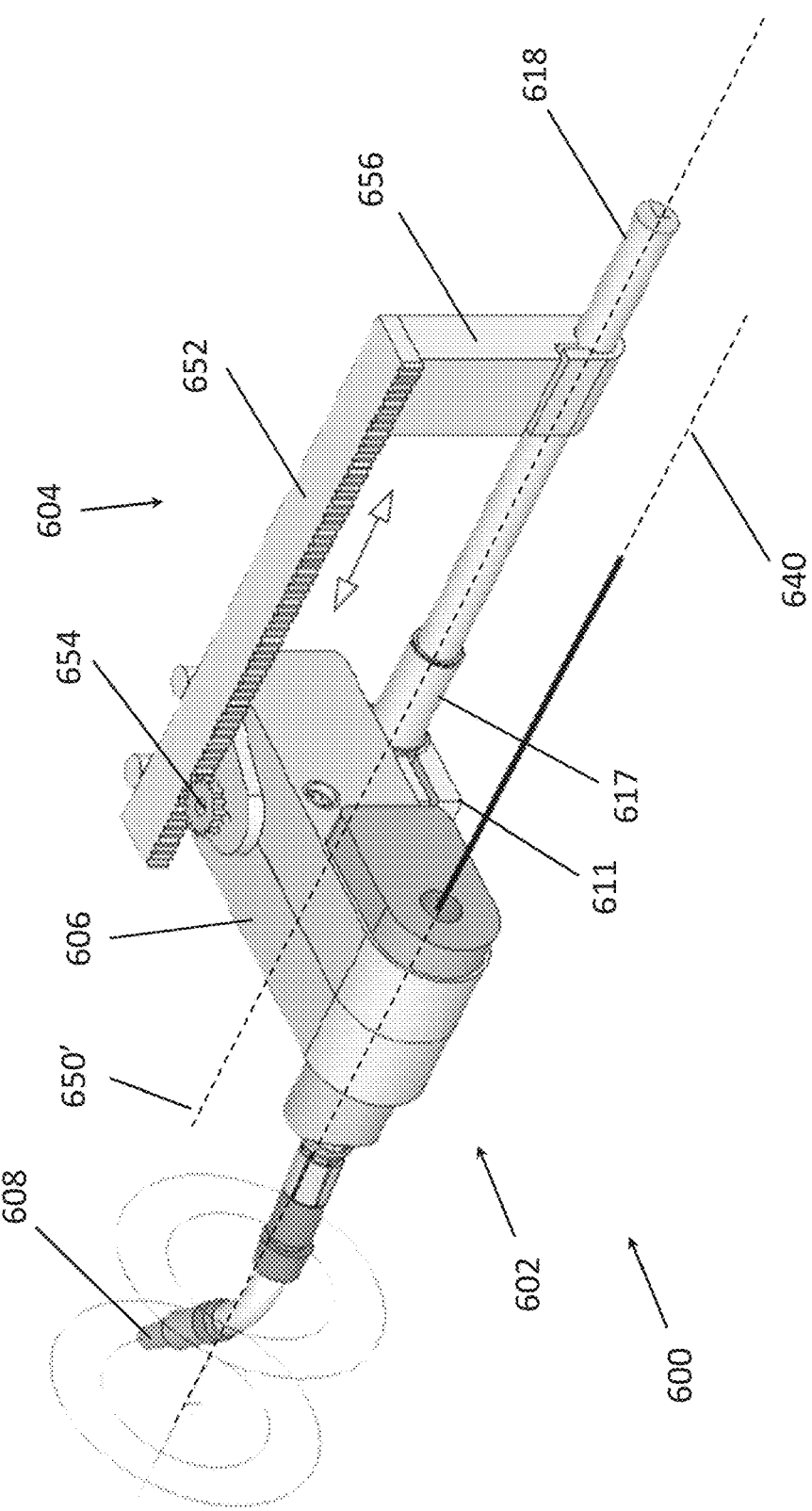

Now turning to FIGS. 6A and 6B, there is described a welding device 600 according to further embodiments of the disclosure. Welding device 600 comprises a welding assembly 602 movably connected to a linear assembly 604.

Welding assembly 602 comprises head module 606 to which is rotatably coupled a welding torch 608. Welding torch 608 is connected to head module 606 by a neck adapter 610 enabling rapid release of welding torch 608 from head module 606 and enabling welding torch 608 to be pivoted relative to head module 606 within a range of orientations. For example, welding torch 608 may be angled by up to 45° relative to a welding axis 640 defined by head module 606. Welding torch 608 is rotatable about welding axis 640 through the operation of a drive mechanism (not shown), such as one or more motors, housed within head module 606.

Linear assembly 604 includes a rack bar 652, a guide shaft 618, and a spacer block 656 spacing rack bar 652 from guide shaft 618. Rack bar 652 is engaged with a pinion 654 provided on head module 606. Through the operation of the drive mechanism in head module 606, pinion 654 may be caused to rotate and thereby drive linear translation of linear assembly 604 along a first axis of translation 650. As linear assembly 604 is translated along axis of translation 650, spacer block 656 slidingly moves over guide shaft 618. Guide shaft 618 is secured to head module 606 using a suitable bracket or clamp 611, and assists with the linear movement of linear assembly 604 relative to welding assembly 602. Pinion 654 extends from a first side of head module 606, and guide shaft 618 is attached to welding assembly 602 on the opposite side of head module 606 as pinion 654.

In the embodiment of FIG. 6A, welding device 600 is configured to perform pad welding on a workpiece 619. Welding device 600 may be reconfigured to transition from its first configuration, as shown in FIG. 6A, to a second configuration, as now described and as shown in FIG. 6B. In this second configuration, welding device 600 is configured to perform bore welding on a workpiece. In order to transition from the first configuration or orientation, to the second configuration or orientation, linear assembly 604 is rotated relative to welding assembly 602. As can be seen in FIG. 6B, linear assembly 604 has been rotated 90° relative to welding assembly 602. For example, loosening of one or more screws or other fasteners may allow welding assembly 602 to be rotated relative to linear assembly 604. In this second configuration, the drive mechanism within head module 606 is operable to drive linear translation of linear assembly 604 along a second axis of translation 650' that is parallel to welding axis 640 and perpendicular to first axis of translation 650.

Similarly to the embodiment of FIG. 1 described above, welding device 600 includes a controller that may comprise, for example, one or more processors operable to read computer program code stored in a suitable computer-readable medium. By executing the computer program code, the one or more processors enable the controller to control movement of welding torch 608 relative to workpiece 619 in need of welding. For example, during the operation of welding tool 600, the controller may control movement of welding torch 608 both about welding axis 640 and first axis of translation 650. In particular, the controller may control head module 606 such that welding torch 608 rotates about welding axis 640 at, for example, a predetermined rate of rotation, or at a predetermined offset angle relative to welding axis 640, depending on the type of weld that the user wishes to obtain. Likewise, in the second configuration shown in FIG. 6B, the controller may control movement of welding torch 608 both about welding axis 640 and along second axis of translation 650'.

Figure 7A:
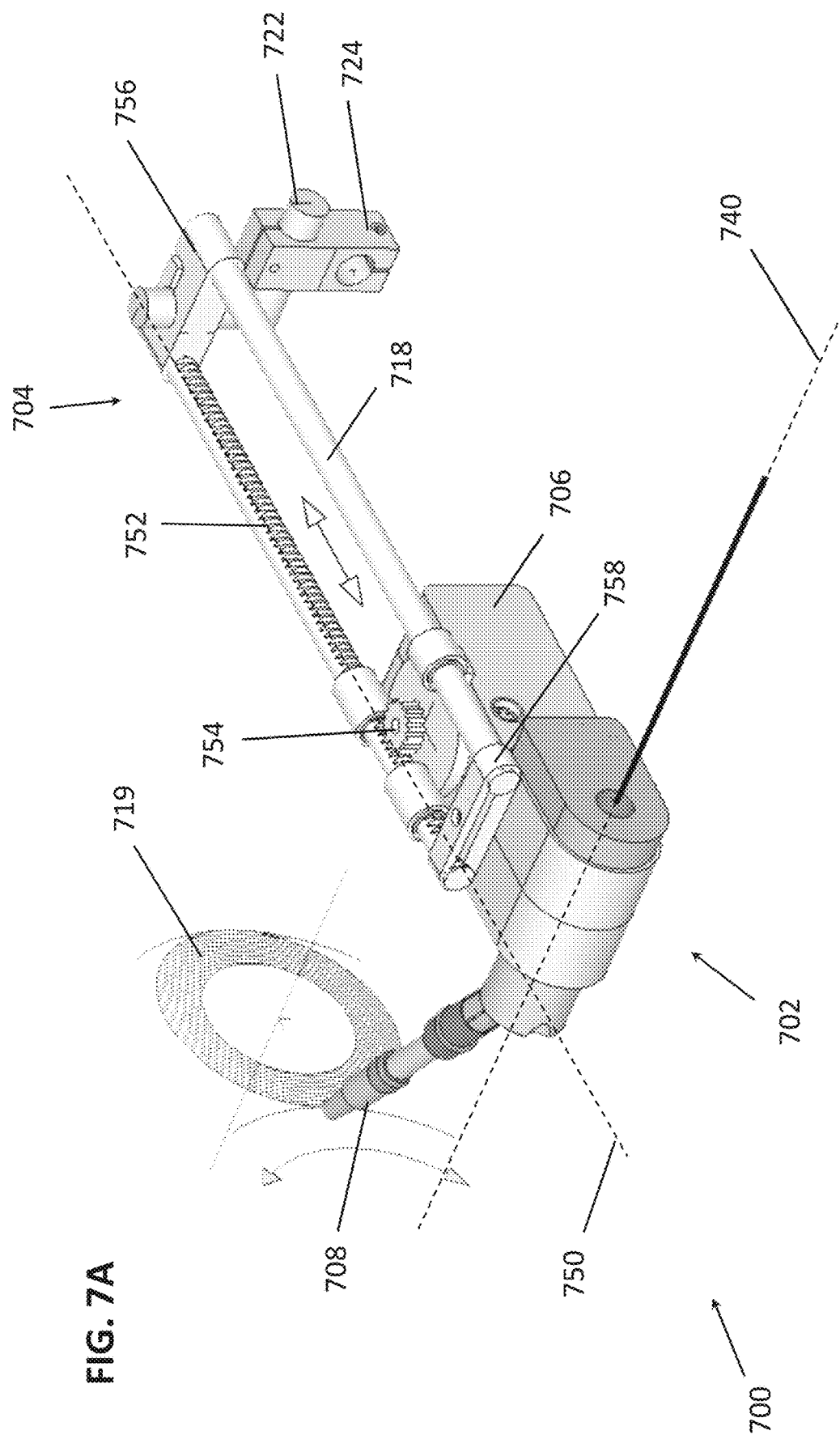
FIGS. 7A and 7B show a welding device in respective first and second configurations, according to embodiments of the disclosure.
Figure 7B:
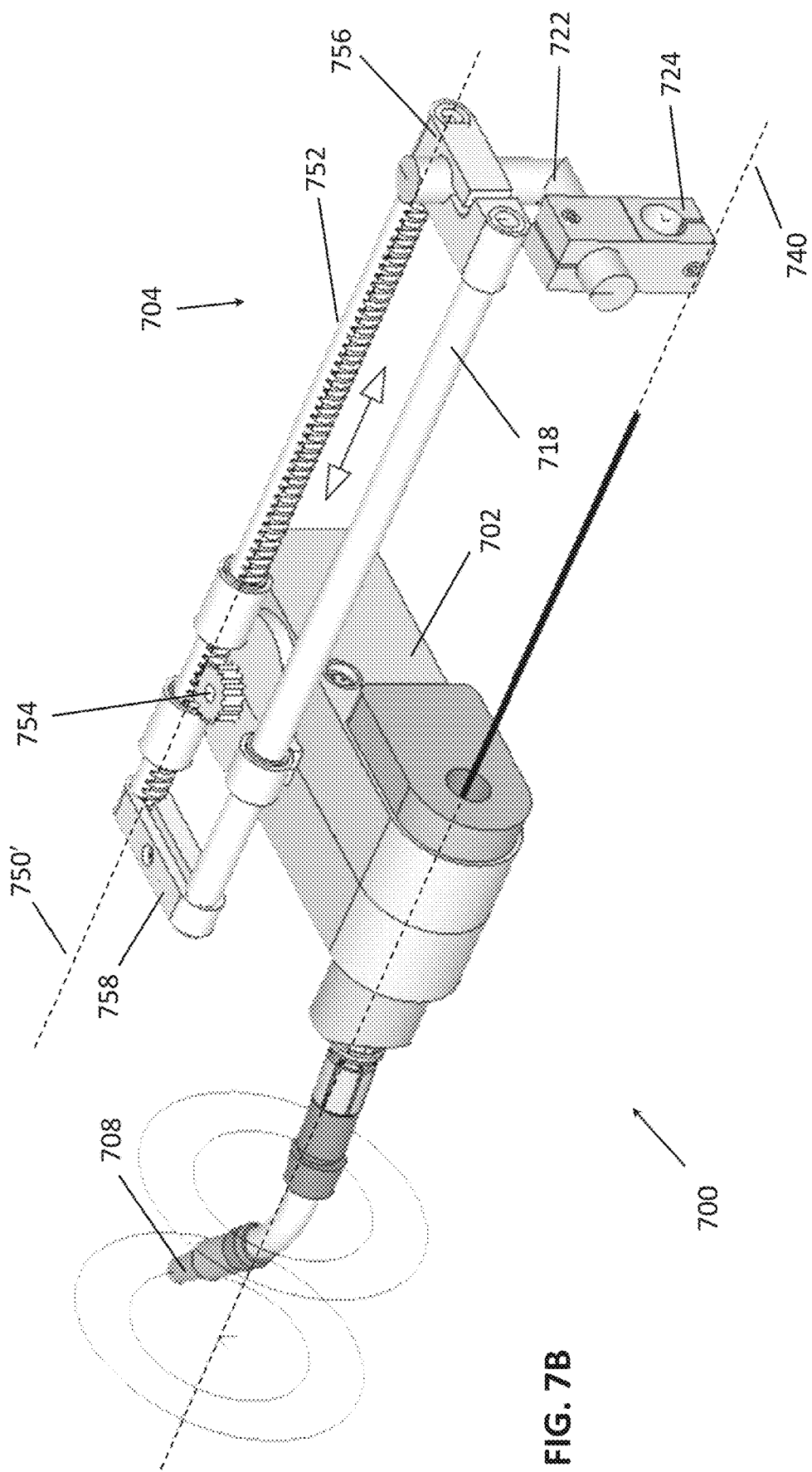

FIGS. 7A and 7B show another embodiment of a welding device 700 that is similar to welding device 600. In this embodiment, linear assembly 704 is connected to a clamp 724 via an elbow pin 722. Elbow pin 722 is attached to both spacer block 756 and to clamp 724. A mounting shaft (not shown) may be secured to clamp 724 and to the workpiece or a solid structure, as described earlier in the context of FIG. 1. Elbow pin 722 may furthermore be rotated relative to spacer block 756 and to clamp 724, to enable orienting of linear assembly 704 and welding assembly 702 about two different and orthogonal axes of orientation, again as described earlier in the context of FIG. 1. Furthermore, pinion 754 extends from a first side of head module 706, and guide shaft 718 is attached to welding assembly 702 on the same side of head module 706 as pinion 754. A further spacer block 758 extends between and connects rack 752 and guide shaft 718, at an end of linear assembly 704 opposite the end at which spacer block 756 is located. Similarly to the embodiment of FIGS. 6A and 6B, linear assembly 704 may be rotated relative to welding assembly 702 and between the first configuration, shown in FIG. 7A, and the second configuration shown in FIG. 7B. For example, loosening of one or more screws or other fasteners may allow welding assembly 702 to be rotated relative to linear assembly 704.

Figure 8:
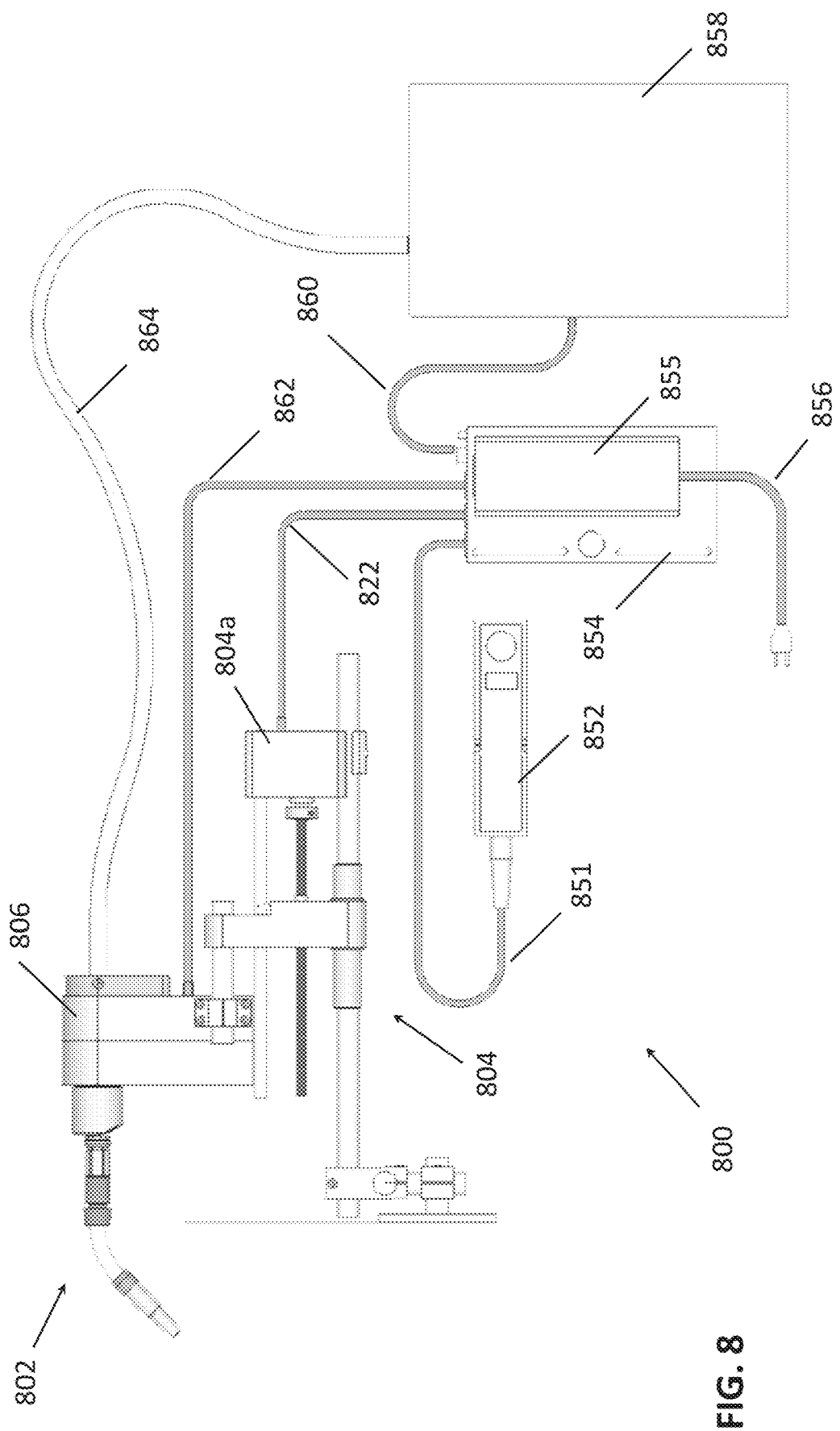
FIG. 8 shows a welding device connected to a control system, according to an embodiment of the disclosure.

Turning to FIG. 8, there is shown a welding device 800 according to an embodiment of the disclosure. Welding device 800 is similar to welding device 100. FIG. 8 shows the control system that controls operation of welding device 800. The welding devices of FIGS. 1-7B may be controlled by a similar control system.

The control system comprises a MIG welding source 858 connected to head module 806 using a MIG current and gas wire feed 864. MIG welding source 858 is connected to a control box 854 using a contactor 860. A power supply 855 of control box 854 draws power, for example, from a 110 Volts AC power source connected to power supply 855 via a power line 856. Control box 854 provides power to head module 806 via a power line 862, provides power to first carriage module 804a using a power line 822, and is connected to a control pendant 852 via a power and signal line 851. A user may provide inputs to handheld control pendant 852 that are then communicated to control box 854. For example, the user may select a jog mode, select a bore diameter, adjust the rotation speed to ensure an appropriate welding travel speed, adjust a step size (a degree of linear translation per rotation), adjust a step direction, and start, pause, and resume welding. Various other parameters may be adjusted and/or controlled through the use of handheld control pendant 852. One or more of the various adjustments may be controlled using, for example, a proportional thumbwheel that may use, for instance, a Hall effect sensor with an analog output.

Figure 9:
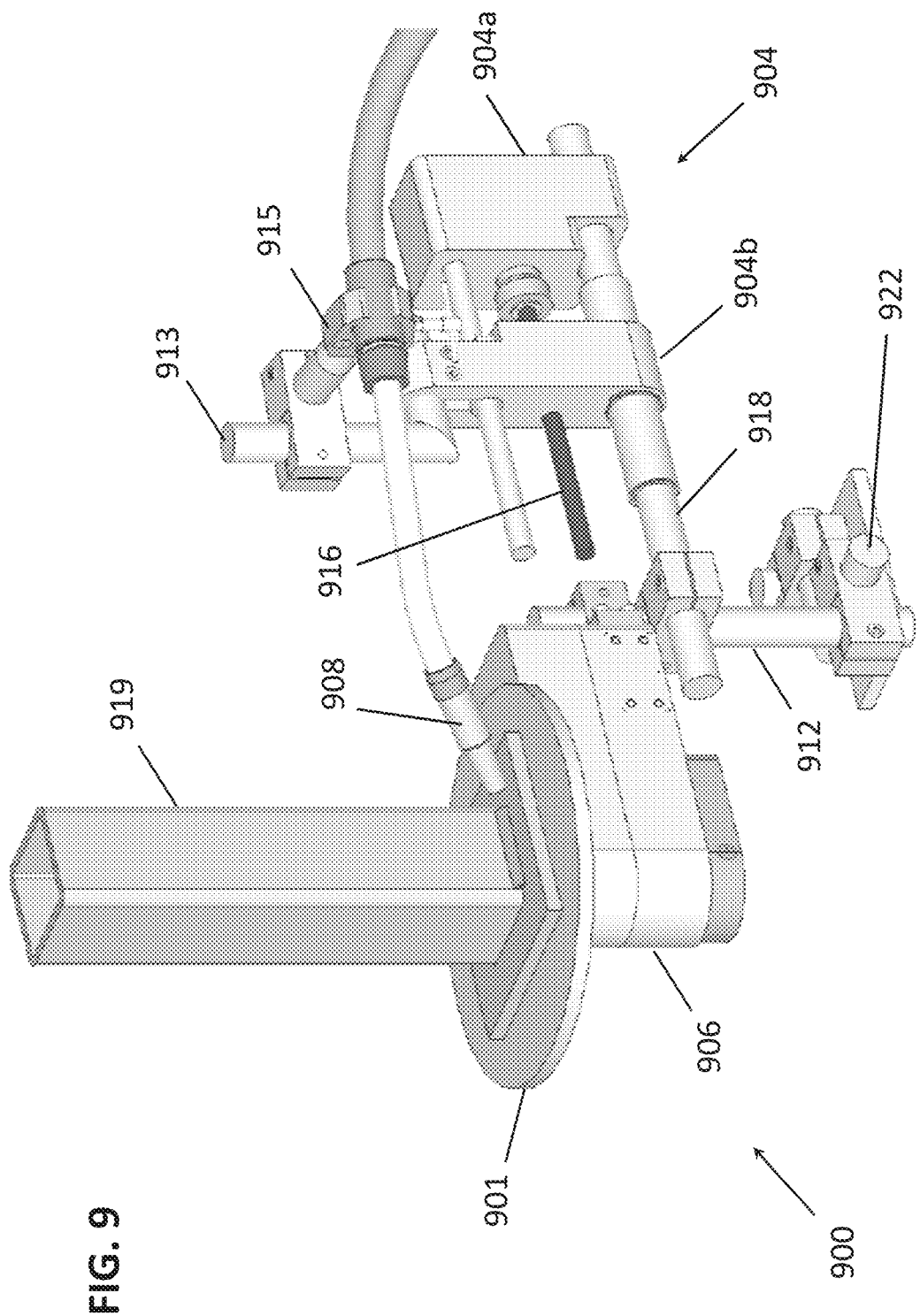
FIG. 9 shows a welding device according to an embodiment of the disclosure.

Turning to FIG. 9, there is shown a welding device 900 according to an embodiment of the disclosure. Welding device 900 comprises a head module 906 operable to rotate a platform 901. A workpiece 919 is fixed to platform 901 such that rotation of platform 901 results in corresponding rotation of workpiece 919. Welding device 900 further comprises a drive assembly 904 releasably secured to head module 906. Drive assembly 904 comprises a first carriage module 904a and a second carriage module 904b. First carriage module 904a is operable to drive linear translation of second carriage module 904b along a slide shaft 918, using a lead screw 916. A welding torch 908 is releasably secured to second carriage module 904b using a right-angle connector 913 and a clamp 915. First carriage module 904a may therefore drive linear translation of welding torch 908 relative to workpiece 919. Head module 906 is releasably secured to a solid structure using a shaft 912 and a right-angle connector 922.

During operation of welding device 900, head module 906 drives rotation of workpiece 919 secured to platform 901. Welding torch 908, being offset from the center of platform 901, may therefore produce straight welds in various locations (controlled by head module 906) in response to linear translation of drive assembly 904. According to some embodiments, welding torch 908 may provide circular or arc-shaped welds to workpiece 919 if welding torch 908 is operated during the rotation of workpiece 919. The radial position of the circular or arc-shaped welds may be adjusted on-the-fly by using drive assembly 904 which may linearly translate welding torch 908 during the welding process. Similarly to the embodiments described above, a suitable control system may be used for controlling the welding process, such as the control system described in connection with FIG. 8.

According to some embodiments, the head module comprises two or more independent carbon brushes with constant force springs for improving the electrical contact between the brushes and the rotating shaft that operates the welding torch. According to some embodiments, the head module comprises three independent carbon brushes with constant force springs for improving the electrical contact between the brushes and the rotating shaft. With high-amperage welding devices, a greater number of brushes may be used.

According to some embodiments, stepper motors may be provided within the head module, drive assembly, and linear assembly of the above-described embodiments. The stepper motors may drive rotation of the welding torch and translation of the drive assembly relative to the head module. The use of stepper motors may provide improved speed control while providing a relatively high torque output, especially at low speeds. This may allow for smaller gear ratios, and in turn may allow for improved torque control. Furthermore, this may allow for the removal of electronics from the head module and drive assembly. Removing the electronics from the head module and drive assembly may ensure that they are kept further away from the electrically noisy welding process.

While the embodiments of FIGS. 1-5B and 9 have been described as using a lead screw to drive linear translation of the drive assembly relative to the welding torch assembly, other means of driving such motion fall within the scope of the disclosure. For example, a rack and pinion, a belt drive, a cable drive, or any other suitable linear actuator may be used in order to implement such motion. Similarly, while the embodiments of FIGS. 6A-7B have been described as using a rack and pinion to drive linear translation of the linear assembly relative to the welding assembly, other means of driving such motion fall within the scope of the disclosure. For example, a lead screw, a belt drive, a cable drive, or any other suitable linear actuator may be used in order to implement such motion.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A welding device comprising:
  a welding torch assembly defining a welding axis and comprising a welding torch rotatable about the welding axis; and
  a drive assembly releasably attachable to the welding torch assembly and operable to linearly translate the welding torch assembly along an axis of translation,
  wherein, when the drive assembly is attached to the welding torch assembly in a first orientation relative to the welding torch assembly, the drive assembly is detachable from the welding torch assembly and re-attachable to the welding torch assembly so as to be disposed in a second orientation relative to the welding torch assembly,
  wherein the welding torch assembly further comprises a head module, wherein the head module is operable to drive rotation of the welding torch about the welding axis and relative to the head module, and wherein the drive assembly is releasably attachable to the head module, and
  wherein the drive assembly comprises a first carriage module and a second carriage module, wherein the drive assembly is operable to linearly translate the second carriage module relative to the first carriage module and along the axis of translation, and wherein the second carriage module is releasably attachable to the head module.

2. The welding device of claim 1, wherein:
  when the drive assembly is attached to the welding torch assembly in the first orientation, the drive assembly is attached to the welding torch assembly at an attachment location on the welding torch assembly; and
  when the drive assembly is attached to the welding torch assembly in the second orientation, the drive assembly is attached to the welding torch assembly at the same attachment location.

3. The welding device of claim 1, wherein:
  when the drive assembly is attached to the welding torch assembly in the first orientation, the drive assembly is attached to the welding torch assembly at an attachment location on the welding torch assembly; and
  when the drive assembly is attached to the welding torch assembly in the second orientation, the drive assembly is attached to the welding torch assembly at a different attachment location.

4. The welding torch of claim 1, wherein the drive assembly is operable to linearly translate the welding torch assembly along the axis of translation using one or more of: a linear actuator; a lead screw; a rack and pinion; a belt drive; and a cable drive.

5. The welding torch of claim 1, wherein the drive assembly further comprises one or more guide members extending from the first carriage module to the second carriage module and for guiding linear translation of the welding torch assembly along the axis of translation.

6. The welding device of claim 1, further comprising an attachment device for securing the welding device relative to a workpiece when the welding device is in use.

7. The welding device of claim 6, wherein the drive assembly further comprises one or more guide members extending from the first carriage module to the second carriage module and for guiding linear translation of the welding torch assembly along the axis of translation, and wherein the attachment device is releasably attachable to at least one of the one or more guide members.

8. The welding device of claim 7, wherein the attachment device comprises:
- a first member that, when the attachment device is attached to the at least one guide member, extends perpendicularly to the axis of translation; and
- a second member that extends perpendicularly to the first member and that, when the attachment device is attached to the at least one guide member, extends perpendicularly to the axis of translation.

9. The welding device of claim 8, wherein:
- the attachment device further comprises a first clamping device releasably attachable to the first member, and a second clamping device releasably attachable to the second member;
- the first member is releasably attachable to the at least one guide member using the first clamping device, and, when attached to the first clamping device, the first member is rotatable relative to the first clamping device for adjusting an orientation of the drive assembly about a first axis of orientation; and
- the second member, when attached to the second clamping device, is rotatable relative to the second clamping device for adjusting an orientation of the drive assembly about a second axis of orientation, when the attachment device is attached to the at least one guide member.

10. The welding device of claim 1, wherein:
- when the drive assembly is attached to the welding torch assembly in the first orientation, the welding torch extends from the head module in a first direction, and drive assembly is operable to linearly translate the first second carriage module relative to the first carriage module, along the axis of translation and in the first direction; and
- when the drive assembly is attached to the welding torch assembly in the second orientation, the welding torch extends from the head module in the first direction, and the drive assembly is operable to linearly translate the second carriage module relative to the first carriage module, along the axis of translation and in a second direction opposite the first direction.

11. The welding device of claim 1, wherein, when the drive assembly is attached to the welding torch assembly in the first orientation or the second orientation relative to the welding torch assembly, the drive assembly is detachable from the welding torch assembly and re-attachable to the welding torch assembly so as to be disposed in at least a third orientation relative to the welding torch assembly, wherein in the third orientation, the axis of translation is perpendicular to the welding axis.

12. The welding device of claim 11, wherein, when the drive assembly is attached to the welding torch assembly in the third orientation, the drive assembly is attached to the welding torch assembly using a right-angle pin.

13. The welding device of claim 1, further comprising a controller comprising one or more processors for performing one or more of:
- controlling the drive assembly so as to control linear translation of the welding torch assembly along the axis of translation;
- controlling the welding torch assembly so as to control rotation of the welding torch about the welding axis; and
- activating and deactivating a welding source for the welding torch.

14. The welding device of claim 1, further comprising an extension member releasably attachable to the welding torch assembly and to the drive assembly.

15. The welding device of claim 14, wherein:
- when attached to the drive assembly, the extension member is rotatable relative to the drive assembly about a first axis of rotation; and
- when attached to welding torch assembly, the extension member is rotatable relative to the welding torch assembly about a second axis of rotation.

16. The welding device of claim 15, wherein the first axis of rotation is parallel to the second axis of rotation.

17. The welding device of claim 1, wherein the drive assembly is a first drive assembly, wherein the axis of translation is a first axis of translation, and wherein the welding device further comprises a second drive assembly releasably attachable to the first drive assembly and operable to linearly translate the first drive assembly along a second axis of translation.

18. The welding device of claim 17, wherein the first axis of translation is perpendicular to the second axis of translation.

19. The welding device of claim 1, wherein the first carriage module is operable to linearly translate the second carriage module relative to the first carriage module and along the axis of translation.

20. A welding device comprising:
- a welding torch assembly defining a welding axis and comprising a welding torch rotatable about the welding axis; and
- a drive assembly releasably attached to the welding torch assembly in a first orientation relative to the welding torch assembly, and operable to linearly translate the welding torch assembly along an axis of translation,
- wherein the drive assembly is detachable from the welding torch assembly and re-attachable to the welding torch assembly so as to be disposed in a second orientation relative to the welding torch assembly,
- wherein the welding torch assembly further comprises a head module, wherein the head module is operable to drive rotation of the welding torch about the welding axis and relative to the head module, and wherein the drive assembly is releasably attached to the head module, and
- wherein the drive assembly comprises a first carriage module and a second carriage module, wherein the drive assembly is operable to linearly translate the second carriage module relative to the first carriage module and along the axis of translation, and wherein the second carriage module is releasably attached to the head module.

* * * * *